(12) United States Patent
Szczerba et al.

(10) Patent No.: US 8,098,170 B1
(45) Date of Patent: Jan. 17, 2012

(54) FULL-WINDSHIELD HEAD-UP DISPLAY INTERFACE FOR SOCIAL NETWORKING

(75) Inventors: Joseph F. Szczerba, Grand Blanc, MI (US); Thomas A. Seder, Northville, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/900,566

(22) Filed: Oct. 8, 2010

(51) Int. Cl.
*G08B 21/00* (2006.01)
(52) U.S. Cl. .............................. 340/905; 340/438; 345/7
(58) Field of Classification Search .................. 340/438, 340/905, 988–996; 345/7–9; 353/13, 14
See application file for complete search history.

(56) References Cited

U.S. PATENT DOCUMENTS

| | | | |
|---|---|---|---|
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 7,796,056 B2 * | 9/2010 | Fein et al. | 340/995.24 |
| 2008/0158096 A1 * | 7/2008 | Breed | 345/7 |
| 2008/0158510 A1 | 7/2008 | Tant et al. | |
| 2009/0268946 A1 | 10/2009 | Zhang et al. | |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253598 A1 | 10/2010 | Szczerba et al. | |
| 2010/0253599 A1 | 10/2010 | Szczerba et al. | |
| 2010/0253600 A1 | 10/2010 | Seder et al. | |
| 2010/0253601 A1 | 10/2010 | Seder et al. | |
| 2010/0253602 A1 | 10/2010 | Szczerba et al. | |

(Continued)

OTHER PUBLICATIONS

U.S. Appl. No. 12/467,340, Szczerba et al.

(Continued)

*Primary Examiner* — Jeffery Hofsass (57) ABSTRACT

A method to dynamically register a graphic identifying social networking subscribers of a social networking service having socialization attributes common to the vehicle onto a driving scene of a vehicle utilizing a substantially transparent windscreen head-up display includes monitoring the social networking service, including: monitoring informational inputs of the vehicle; monitoring broadcasted socialization attributes of the social networking subscribers; and identifying the social networking subscribers having the socialization attributes common to the vehicle based on the monitored informational inputs of the vehicle and the monitored broadcasted socialization attributes of the social networking subscribers. The graphic identifying the social networking subscribers having the socialization attributes common to the vehicle is determined, and a location of the graphic is dynamically registered upon the substantially transparent windscreen head-up display corresponding to the driving scene of the vehicle. The graphic is displayed onto the driving scene of the vehicle utilizing a substantially transparent windscreen head-up display including one of light emitting particles or microstructures over a predefined region of the windscreen permitting luminescent display while permitting transmission therethrough.

20 Claims, 3 Drawing Sheets

U.S. PATENT DOCUMENTS

2010/0253688 A1 10/2010 Cui et al.
2010/0253918 A1 10/2010 Seder et al.
2010/0254019 A1 10/2010 Cui et al.

OTHER PUBLICATIONS

U.S. Appl. No. 12/467,350, Seder et al.
U.S. Appl. No. 12/903,267, Seder et al.
U.S. Appl. No. 12/900,566, Szczerba et al.
U.S. Appl. No. 12/980,503, Szczerba et al.
U.S. Appl. No. 12/979,432, Szczerba et al.
U.S. Appl. No. 12/980,522, Szczerba et al.
U.S. Appl. No. 12/980,612, Szczerba et al.
U.S. Appl. No. 12/981,206, Szczerba et al.
U.S. Appl. No. 12/981,602, Szczerba et al.
U.S. Appl. No. 12/982,478, Szczerba et al.

* cited by examiner

FULL-WINDSHIELD HEAD-UP DISPLAY INTERFACE FOR SOCIAL NETWORKING

TECHNICAL FIELD

This disclosure is related to graphical imaging an interface for social networking upon a windscreen in a motor vehicle.

BACKGROUND

The statements in this section merely provide background information related to the present disclosure and may not constitute prior art.

Social networking in vehicles is being introduced to keep people connected as they are driving, allowing them to stay connected to what they want to stay connected to, whether it be a friend network, music or traffic directions. It would be desirable for people of a social network to remain aware of physical local presence of other people and vehicles within their social network or possess desired socialization attributes. For example, a person driving along a freeway may desire to locate and identify all people along the freeway being subscribers to a social networking service that possess the same interests. However, identifying social networking subscribers having common socialization attributes can be problematic because there is no way to identify people or vehicles on the driving scene. It may require an operator of the vehicle to take his/her eyes off of the road to determine which people or vehicles possess the common socialization attributes.

Vehicle to vehicle communications are known to utilize data collected in one vehicle in communicating with vehicles elsewhere on the road. Head-up displays project light upon a screen and the light is converted into a viewable display upon the screen. Head-up displays are known to present information to the operator of the vehicle in an effective manner by reducing strain upon the operator while allowing the operator to remain focused on driving.

SUMMARY

A method to dynamically register a graphic identifying social networking subscribers of a social networking service having socialization attributes common to the vehicle onto a driving scene of a vehicle utilizing a substantially transparent windscreen head-up display includes monitoring the social networking service, including: monitoring informational inputs of the vehicle; monitoring broadcasted socialization attributes of the social networking subscribers; and identifying the social networking subscribers having the socialization attributes common to the vehicle based on the monitored informational inputs of the vehicle and the monitored broadcasted socialization attributes of the social networking subscribers. The graphic identifying the social networking subscribers having the socialization attributes common to the vehicle is determined, and a location of the graphic is dynamically registered upon the substantially transparent windscreen head-up display corresponding to the driving scene of the vehicle. The graphic is displayed onto the driving scene of the vehicle utilizing a substantially transparent windscreen head-up display including one of light emitting particles or microstructures over a predefined region of the windscreen permitting luminescent display while permitting transmission therethrough.

BRIEF DESCRIPTION OF THE DRAWINGS

One or more embodiments will now be described, by way of example, with reference to the accompanying drawings, in which.

DETAILED DESCRIPTION

Referring now to the drawings, wherein the showings are for the purpose of illustrating certain exemplary embodiments only and not for the purpose of limiting the same, a method utilizing an enhanced vision system (EVS) to represent graphical images upon a windscreen of a vehicle identifying social networking subscribers having common socialization attributes to the vehicle is disclosed. The graphical images originate from sensor and/or data inputs describing the socialization attributes and include processing of the inputs in order to convey the identification of other vehicles possessing common socialization attributes to the operator or occupants of the vehicle. Graphical images to be displayed upon the windscreen are dynamically registered to a location upon the windscreen corresponding to a driving scene of the vehicle, such that an intended operator or occupant of the vehicle may view the other vehicles and the registered graphical image identifying the other vehicles having common socialization attributes as a single discernable input.

Figure 1:
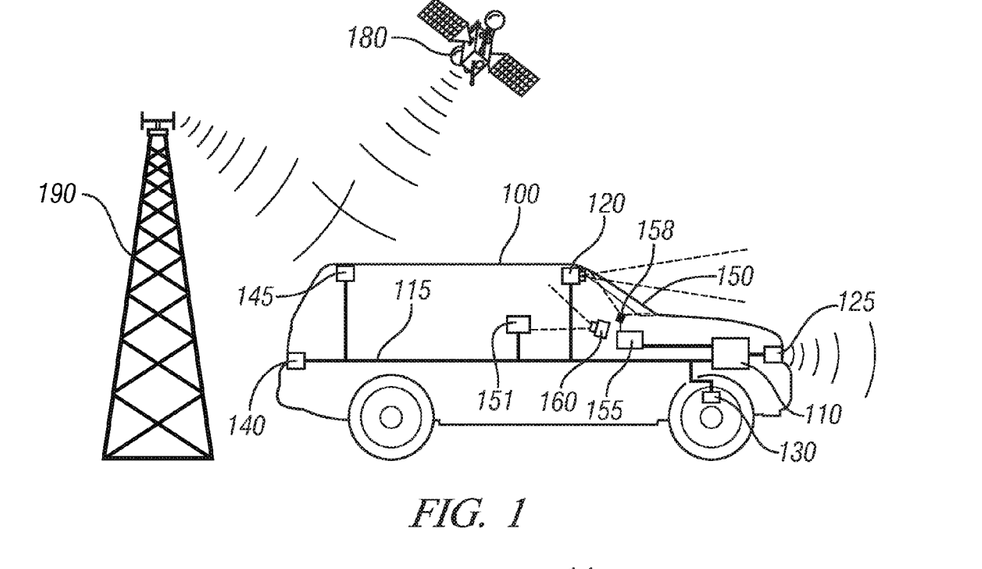
FIG. 1 depicts an exemplary vehicle equipped with an EVS system, in accordance with the present disclosure.

FIG. 1 depicts an exemplary vehicle equipped with an EVS system, in accordance with the present disclosure. Co-pending U.S. application Ser. No. 12/417,077, entitled ENHANCED VISION SYSTEM FULL-WINDSHIELD HUD, filed on Apr. 2, 2009 which is hereby incorporated herein by reference discloses the exemplary EVS system. Vehicle 100 includes an EVS system manager 110; vehicle sensor systems, including camera system 120 and radar system 125; vehicle operation sensors, including vehicle speed sensor 130; information systems, including GPS device 140 and wireless communication system 145; heads-up display (HUD) 150; human machine interface (HMI) 151; EVS graphics system 155; graphics projection system 158; and occupant eye location sensing system 160. The EVS system manager 110 includes a programmable processor and programming to monitor various inputs and identify social networking subscribers of a social networking service having common socialization attributes to the vehicle 100 to display upon the HUD 150. The EVS system manager can communication directly with various systems and components, or the EVS system manager can alternatively or additionally communicate over a LAN/CAN system 115. The EVS system manager utilizes information regarding the operational environment of the vehicle derived from a number of inputs. Camera system 120 includes a camera or image capturing device taking periodic or sequential images representing a view from the vehicle. Radar system 125 includes a device known in the art utilizing electromagnetic radiation to detect other vehicles or objects located near the vehicle. A number of known in-vehicle sensors are widely used within a vehicle to monitor vehicle speed, engine speed, wheel slip, and other parameters descriptive of the operation of the vehicle. Exemplary vehicle speed sensor 130 is depicted to represent such an in-vehicle sensor describing vehicle operation, but the disclosure intends to include any such sensors for use by the EVS. GPS device 140 and wireless communication system 145 are devices known in the art for communicating with resources outside of the vehicle, for example, satellite system 180 and cellular communications tower 190. GPS device 140 may be utilized in conjunction with a 3D map database including detailed information relating to a global coordinate received by the GPS device 140 regarding the current location of the vehicle. Information from the vehicle sensor systems and the vehicle operator sensors can be utilized by the EVS system manager 110 to monitor the current orientation of the vehicle. HUD 150 includes a windscreen equipped with features capable of displaying an image projected thereupon while remaining transparent or substantially transparent such that occupants of the vehicle can clearly observe outside of the vehicle through the windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. HMI 151 includes a computing device where the operator of the vehicle can input commands to control various systems of the vehicle in signal communication with the HMI 151 and receive desirable information. For instance, utilizing the HMI 151, the operator can search for social networking subscribers having socialization attributes common to the operator of the vehicle. EVS graphics engine 155 includes display software or programming translating requests to display information from the EVS system manager 110 in graphical representations describing the information. The EVS graphics engine 155 includes programming to compensate for the curved and tilted surface of the windscreen and any other surfaces onto which graphics are to be projected. EVS graphics engine 155 controls graphics projection system 158 including a laser or projector device producing an excitation light to project the graphical representations. Occupant eye location sensing system 160 includes sensors known in the art to approximate a location of the head of an occupant and further the orientation or gaze location of the eyes of the occupant. Based upon the output of the occupant eye location sensing system 160, the current orientation of the vehicle 100 and input data tracking location information regarding the environment around the vehicle (e.g., identified social networking subscribers), EVS system manager 110 can accurately dynamically register the graphical representations to the HUD such the occupant sees the images overlaid with visual images through the windscreen.

The EVS described above includes eye sensing and head sensing devices allowing estimation of eye location, allowing dynamic registration of images upon the HUD such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the HUD are contemplated, and the disclosure is not intended to be limited to the particular embodiments described herein.

An exemplary EVS includes a wide field of view, full windscreen (HUD), a substantially transparent screen including functionality to display graphical images projected thereupon; a HUD image engine including a laser or lasers capable of projecting images upon the windscreen; input sources deriving data concerning the operating environment of the vehicle; and an EVS system manager including programming to monitor inputs from the input devices, process the inputs and determine critical information relative to the operating environment, and create requests for graphical images to be created by the HUD image engine. However, it will be appreciated that this exemplary EVS is only one of a wide number of configurations that an EVS can take. For example, a vision or camera system is useful to various EVS applications that will be discussed. However, it will be appreciated that an exemplary EVS system can operate without a vision system, for example, providing information available from only a GPS device, 3D map database, and in-vehicle sensors. In the alternative, it will be appreciated that an exemplary EVS system can operate without access to a GPS device or wireless network, instead utilizing inputs only from a vision system and radar system. Many various configurations are possible with the disclosed systems and methods, and the disclosure is not intended to limited to the exemplary embodiments described herein.

Figure 2:
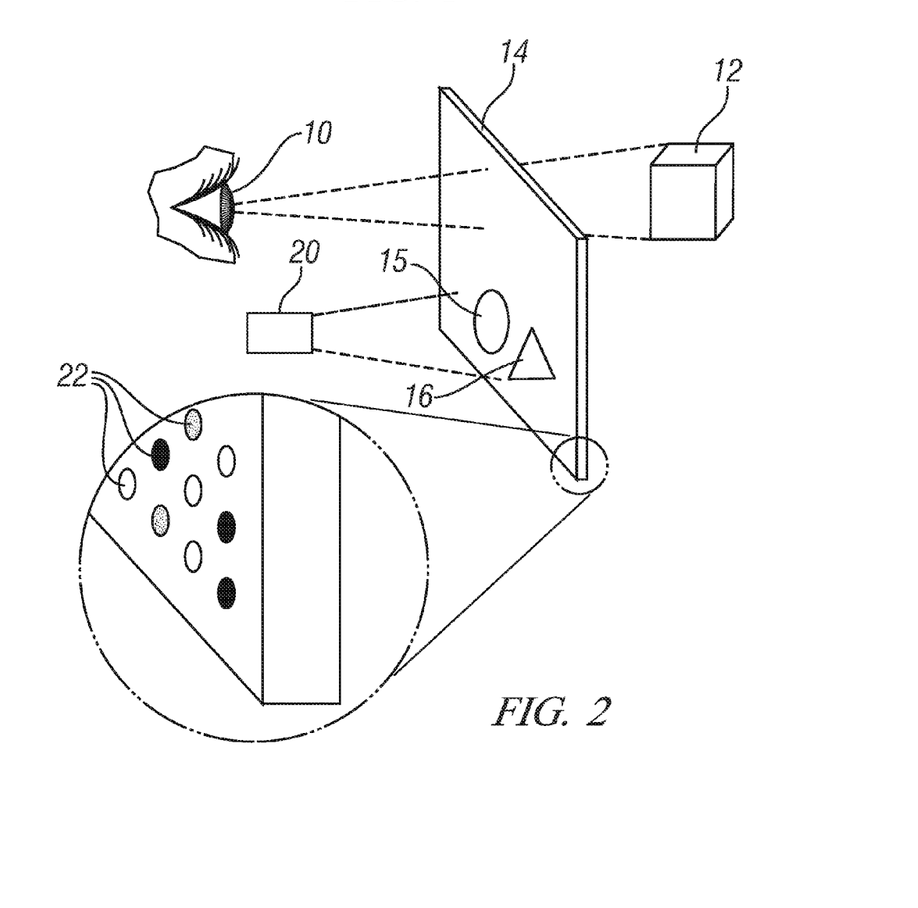
FIG. 2 is an exemplary diagram of a substantially transparent display, in accordance with the present disclosure.

The windscreen including HUD is important to operation of the EVS. In order to function as a medium through which relevant features are observable while serving as a display device upon which the graphical images may be displayed, the windscreen of the vehicle must be both transparent and capable of displaying images projected by an excitation light source. FIG. 2 is an exemplary diagram of a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a building window, a glass substrate, a plastic substrate, a polymer substrate, or other transparent (or substantially transparent) medium that would be appreciated by one having ordinary skill in the art. Other substrates may complement substrate 14 to provide for tinting, substrate protection, light filtering (e.g. filtering external ultraviolet light), and other functions.

FIG. 2 depicts illumination of transparent displays illuminated with excitation light (e.g. ultraviolet light or infrared light) from light sources (e.g. a projector or laser, depicted by device 20, in accordance with embodiments. Substrate 14 may receive excitation light from a light source (e.g. projector or laser 20). The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In embodiments illustrated in FIG. 2, the excitation light is output by device 20 including a projector. The projector may be a digital projector. In embodiments, the projector is a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. In other embodiments, the projector is a liquid crystal display (LCD) projector. In embodiments, the projector may be a liquid crystal on silicon (LCOS) projector. In embodiments, the projector may be an analog projector (e.g. a slide film projector or a movie film projector). One having ordinary skill in the art would appreciate other types of projectors which may be used to project ultraviolet light on substrate 14.

Returning to the exemplary embodiment illustrated in FIG. 2, an excitation light is output from device 20, in this example, a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 2 is an exemplary diagram of light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 2 illustrates light emitting material, including light emitting particles 22, dispersed in a substantially transparent substrate, according to embodiments of the disclosure. These light emitting particles 22 can be substantially similar particles throughout, or, as depicted in FIG. 2, the particles can vary in composition. When excitation light is absorbed by the light emitting particles 22, the particles emit visible light. Accordingly, in down-conversion embodiments, when ultraviolet light is absorbed by light emitting materials, visible light is emitted from the light emitting materials. Likewise, in up-conversion embodiments, when infrared light is absorbed by light emitting materials, visible light is emitted from the light emitting materials. In embodiments, each of light emitting materials may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as depicted in FIG. 2, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 400 nanometers. According to embodiments, each of the light emitting particles has a diameter that is less than about 300 nanometers. According to embodiments, each of the light emitting particles has a diameter that is less than about 200 nanometers. According to embodiments, each of the light emitting particles has a diameter that is less than about 100 nanometers. According to other embodiments, each of the light emitting particles has a diameter that is less than about 50 nanometers. The light emitting particles may be individual molecules.

Other methods can be applied for integrating light emitting materials on a surface of substrate 14. Similar to embodiments illustrated in FIG. 2, each of the light emitting materials may be a different type of light emitting material, which emit a different range of wavelengths of visible light in response to a different range of wavelengths of excitation light (e.g. ultraviolet or infrared light). Light emitting material may be fluorescent material, which emits visible light in response to absorption of electromagnetic radiation (e.g. visible light, ultraviolet light, or infrared light) that is a different wavelength than the emitted visible light. Light emitting material may include light emitting particles.

Figure 3:
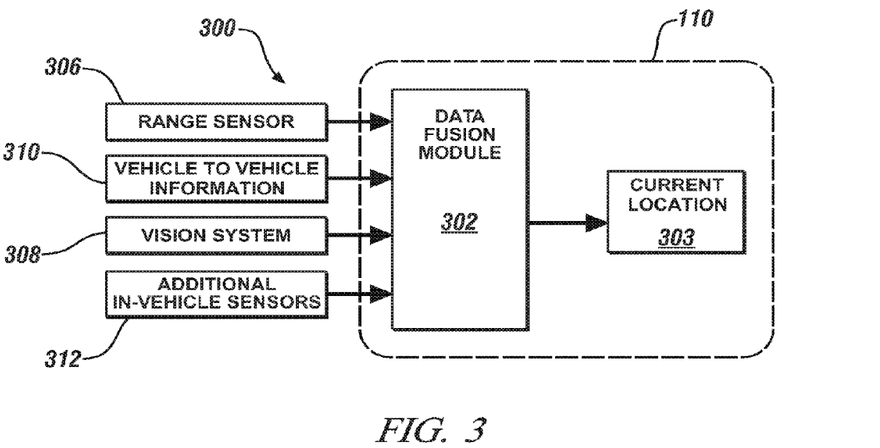
FIG. 3 schematically illustrates an exemplary target tracking system 300 whereby sensor inputs are fused to continuously determine a current location 303 of a remote or target object being tracked, in accordance with the present disclosure.

FIG. 3 shows a schematic diagram of a target tracking system 300, in accordance with the present disclosure. The exemplary vehicle 100 of FIG. 1 includes a passenger vehicle intended for use on highways, although it is understood that the disclosure described herein is applicable on any vehicle or other system seeking to monitor position and trajectory of remote vehicles and other objects. The target tracking system 300 is associated with the EVS system manager 110 architecture and contains various control schemes and calibrations executed at various times. The target tracking system 300 is operable to monitor inputs from various sensors and sources, synthesize pertinent information and inputs and execute algorithms to control various actuators to achieve control targets, including monitoring the current location of identified social networking subscribers having socialization attributes common to the vehicle.

FIG. 3 schematically illustrates the exemplary target tracking system 300 whereby sensor inputs are fused to continuously determine the current location 303 of a remote or target object being tracked. Inputs related to target objects in an environment around the vehicle are monitored by a data fusion module 302. The data fusion module 302 analyzes, filters, or prioritizes the inputs relative to the reliability of the various inputs, and the prioritized or weighted inputs are summed to determine the current location of the target object.

As described in FIG. 3, the data fusion module 302 is useful to integrate input from various sensing devices and generate a fused track of the target object to determine the current location of the target object. The fused track includes a data estimate of relative location and trajectory of the target object relative to the vehicle. This data estimate, based upon range sensors 306 including radar, lidar and other range finding sensor inputs is useful, but includes the inaccuracies and imprecision of the sensor devices utilized to create the track. As described above, different sensor inputs can be utilized in unison to improve accuracy of the estimates involved in determining the current location of the target object.

Vision systems provide an alternate source of sensor input for use in the target tracking system 300. Methods for analyzing visual information are known in the art to include pattern recognition, corner detection, vertical edge detection, vertical object recognition, and other methods. However, it will be appreciated that high-resolution visual representations of the field in front a vehicle refreshing at a high rate necessary to appreciate motion in real-time include a very large amount of information to be analyzed. Real-time analysis of visual information is resource intensive and may not be practical. A method is disclosed to fuse input from the vision system 308 with range sensors 306 described above to focus vision analysis upon a portion of the visual information most likely to determine the current location of the target object.

Additional in-vehicle sensors 312 including, but not limited to, infrared and ultrasonic information can be utilized with the data fusion module 302 of the target tracking system 300 to determine the current location 303 of the target object.

Further, vehicle to vehicle information 310 can be utilized to determine the current location 303 of the target object when the target object is another vehicle. When the target object is a second vehicle, the second vehicle communicates its current location to the control system (e.g., EVS system manager 110) of the vehicle. The current location communicated by the second vehicle can include the second vehicle providing GPS coordinates in conjunction with 3D map data to the vehicle. The vehicle to vehicle information 310 can be used alone or can be used in the fusion module 302 with the various sensing devices to generate the fused track of the target object to determine the current location 303 of the target object.

It should further be appreciated that the data fusion module 302 of FIG. 3 can be utilized to continuously monitor the surrounding environment using its range sensors (e.g., radars and lidars), cameras and vehicle to vehicle communication to take appropriate counter-measurements in order to avoid incidents or situations to develop into a collision by assessing the input from the sensing devices. Additionally, a known exemplary trajectory fusing process, for example as disclosed in U.S. Pat. No. 7,460,951, incorporated herein by reference, permits determining position of a target object in the XY-coordinate system relative to the vehicle. Likewise, object tracks can be utilized for a variety of purposes including adaptive cruise control, wherein the vehicle adjusts speed to maintain a minimum distance from vehicles in the current path, as described above. Another similar system wherein object tracks can be utilized is a collision preparation system (CPS), wherein identified object tracks are analyzed in order to identify a likely impending or imminent collision based upon the track motion relative to the vehicle. A CPS warns the driver of an impending collision and reduces collision severity by automatic braking if a collision is considered to be unavoidable.

All of the mentioned inputs can be utilized by the exemplary EVS system manager 110. Additionally, it will be appreciated that the EVS system manager has access to methods described above related to target tracking to determine the current location of the target object, wherein the target object is an identified social networking subscriber having socialization attributes common to the vehicle.

Embodiments envisioned include dynamically registering a graphic onto a driving scene of a vehicle utilizing a substantially transparent windscreen HUD, wherein the graphic identifies social networking subscribers of a social networking service having socialization attributes common to the vehicle. Dynamically registering the graphic onto the driving scene of the vehicle requires monitoring data related to an occupant eye location (and/or head location), monitoring a current orientation of the vehicle and monitoring a current location of a target object (e.g., the identified social networking subscribers). With reference to FIGS. 1 and 3, the occupant eye location sensing system 160 includes sensors known in the art to approximate a location of the head of an occupant and further the orientation or gaze location of the eyes of the occupant. An occupant can be an operator of the vehicle or a passenger within the vehicle. Head and eye sensing devices are known in the art and will not be discussed in significant detail here. For the purposes of example in this disclosure, a camera based device is utilized in combination with image recognition software to estimate a three-dimensional head location within the vehicle, able to be coordinated with a vehicle coordinate system, and a direction of occupant's gaze based upon image recognition programming.

The current orientation of the vehicle can be determined by methods known in the art such as, but not limited to, monitoring the GPS device 140 in conjunction with a 3D map database and a digital compass including detailed information relating to a global coordinate received by the GPS device 140 regarding the current location of the vehicle. The current orientation can also be determined by vehicle kinematics including at least vehicle speed and yaw rate, available through sensors monitoring vehicle operation and/or monitoring accelerometer readings.

The current location of the target object can be monitored by analyzing the data obtained by the target tracking system 300 described above in FIG. 3, where one or more sensors are used in conjunction with each other to monitor the current location of the target object. For instance, vehicle sensor systems, including camera system 120 and radar system 125 can fuse collected information to monitor the current location of the target object. Likewise, vehicle to vehicle communication can be utilized where the target object is a second vehicle that continuously conveys its current location back to the vehicle (e.g., conveys GPS information).

Based on the occupant eye location, the current orientation of the vehicle, and the current location of the target object (e.g., the identified social networking subscribers), an estimated point of intersection between the tracked object (e.g., the identified social networking subscribers) and the operator's eyes can be determined upon the windscreen, thereby enabling graphical images to be dynamically registered to a location upon the windscreen corresponding to the driving scene of the vehicle, such that the occupant of the vehicle may view the identified social networking subscribers and the registered graphical image identifying the social networking subscribers as a single discernable input.

It will be further appreciated that the dynamically registered graphics can be dynamically updated based upon the occupant's gaze location, the current orientation of the vehicle and the current location of the identified social networking subscriber. As will be described in more detail below with specific examples, emphasis to the registered graphic can be enhanced or decreased based on the distance between the occupant's gaze location and the identified social networking subscriber on the driving scene.

Figure 4:
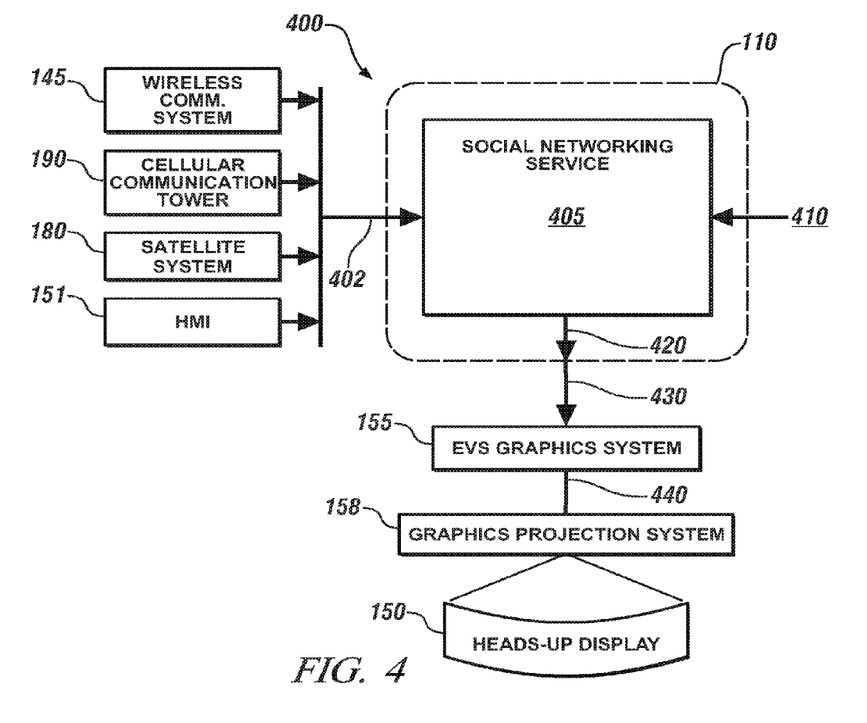
FIG. 4 schematically depicts an exemplary information flow accomplishing methods described above, in accordance with the present disclosure.

Referring to FIG. 4, a schematic depiction of an exemplary information flow to identify and locate social networking subscribers of a social networking service having socialization attributes common to the vehicle is illustrated in accordance with the present disclosure. Process 400 includes an EVS system manager 110 monitoring information from various sources and generating display requirements 430, EVS graphics system 155 monitoring the display requirements 430 from the EVS system manager and generating graphics commands 440, and a graphics projection system 158 projecting light upon a heads-up display 150. Specifically, the EVS system manager 110 monitors a social networking service 405. Monitoring the social networking service 405 includes monitoring informational inputs 402 of the vehicle, monitoring broadcasted socialization attributes 410 of the social networking subscribers and identifying social networking subscribers 420 having socialization attributes common to the vehicle based on the informational inputs 402 of the vehicle and the broadcasted socialization attributes 410 of the social networking subscribers. The EVS graphics system 155 utilizing the display requirements 430 generated by the EVS system manager 110 and based on the identified social networking subscribers 420, determines a graphic identifying the social networking subscribers having the socialization attributes 410 common to the vehicle as a graphics command 440 to the graphics projection system 158. It will be appreciated that the display requirements include dynamically registering a location of the graphic upon the heads-up display corresponding to the driving scene of the vehicle. Dynamically registering the graphic upon the heads-up display corresponding to the driving scene is discussed above and will not be discussed in detail herein. The graphics projection system 158 displays the graphic onto the driving scene of the vehicle utilizing the heads-up display.

Monitoring the informational inputs 402 of the vehicle includes monitoring a search request input by an occupant of the vehicle into the social networking service 405 to identify the social networking subscribers within a driving environment of the vehicle having the broadcasted socialization attributes 410 common to the search request. The driving environment includes a predetermined radius of the vehicle selected by the occupant. For example, the driver can input the search request to identify the social networking subscribers within a city's limits or within a block the vehicle is currently traveling. The occupant of the vehicle can utilize a plurality of sources to input the search request into the social networking service 405 including, but not limited to, a PDA device or computer utilizing the wireless communication system 145, the satellite system 180 and the cellular communications tower 190. The occupant of the vehicle can also utilize the HMI 151 to input the search request, wherein the HMI 151 can utilize the wireless communication system 145, the satellite system 180 and cellular communications tower 190 to communicate with the social networking service 405. The social networking service 405 thereby monitors the search request input by the occupant of the vehicle and identifies the social networking subscribers 420 having the broadcasted socialization attributes 410 common to the search request. Social networking subscribers broadcasting socialization attributes can include other vehicles or pedestrians wirelessly broadcasting (e.g., via PDA devices or personal computers).

The identifying the social networking subscribers 420 having the socialization attributes common to the vehicle can further includes monitoring a vehicle to vehicle communication. The vehicle to vehicle communication includes conveying the search request input by the occupant of the vehicle into the social networking service 405 to a second vehicle of the social networking service 405. The second vehicle thereby transfers the socialization attributes common to the search request to the vehicle and transfers the current location of the second vehicle to the vehicle. It is understood that this vehicle to vehicle communication can also be utilized to determine the current location of the second vehicle (i.e., target object) for dynamically registering graphics upon the heads-up display as discussed above. The determined graphic identifying the social networking subscribers 420 having the socialization attributes common to the vehicle can include utilizing a highlighted box encompassing the second vehicle onto the driving scene of the vehicle utilizing the heads-up display 150. The determined graphic identifying the social networking subscribers having the socialization attributes common to the vehicle can further include a textual message describing the socialization attributes common to the vehicle.

As aforementioned, the dynamically registered graphics can be updated based upon the occupant's gaze location. For instance, emphasis can be added to a graphic utilizing a highlighted box encompassing an identified social networking subscriber based on an increasing distance between the occupant gaze location and the current location of the identified social networking subscriber. In another example, when the graphic utilizes a textual message to describe the socialization attributes common to the vehicle, emphasis can be added to the textual message graphic based on a decreasing distance between the occupant gaze location and the current location of the identified social networking subscriber because the decreasing distance determines that the occupant of the vehicle may be concentrating on the textual message.

As aforementioned, the EVS system manager 110 in conjunction with the social networking service 405 identifies broadcasted socialization attributes 410 of social networking subscribers that match the informational inputs 402 of the vehicle, wherein socialization attributes common to the vehicle are determined based on the identified broadcasted socialization attributes of the social networking subscribers that match the informational inputs of the vehicle. The informational inputs to the social networking service 405 can include, for example, friend networks, interests, and a broadcasted social status.

The above embodiments describe methods whereby social networking subscribers having socialization attributes common to an occupant of the vehicle can be identified and a graphical image can be dynamically registered and displayed upon the substantially transparent windscreen head-up display corresponding to the driving scene of the vehicle identifying the social networking subscribers having the socialization attributes common to the occupant of the vehicle. It will be appreciated that the dynamically registered graphic can be displayed upon the substantially transparent windscreen head-up display based upon monitoring a social networking service, for instance utilizing the HMI 151 to wirelessly communicate inputs to the social networking service. It is appreciated that the substantially transparent windscreen head-up display includes light emitting particles or microstructures over a predefined region of the windscreen permitting luminescent display while permitting vision therethrough.

Additionally, vehicle to vehicle communication, utilizing a social networking service, can monitor a plurality of vehicles that are subscribers of the social networking service to identify vehicles that possess desired socialization attributes conveyed by the vehicle, wherein a graphic is determined that locates each of the vehicles that possess the desired socialization attributes. The location of each vehicle that possess the desired socialization attributes can be transferred to the vehicle utilizing GPS and 3D map data to determine the location of each vehicle that possesses the desired socialization attributes. Further, a first graphic can be configured to provide pertinent social information corresponding to each vehicle that possesses the desired socialization attributes and a second graphic can be utilized to locate each vehicle that possesses the desired socialization attributes. For example, a textual graphic can be utilized to describe the pertinent social information and a highlighted box encompassing the vehicle can be utilized to locate the vehicle on the driving scene.

Figure 5:
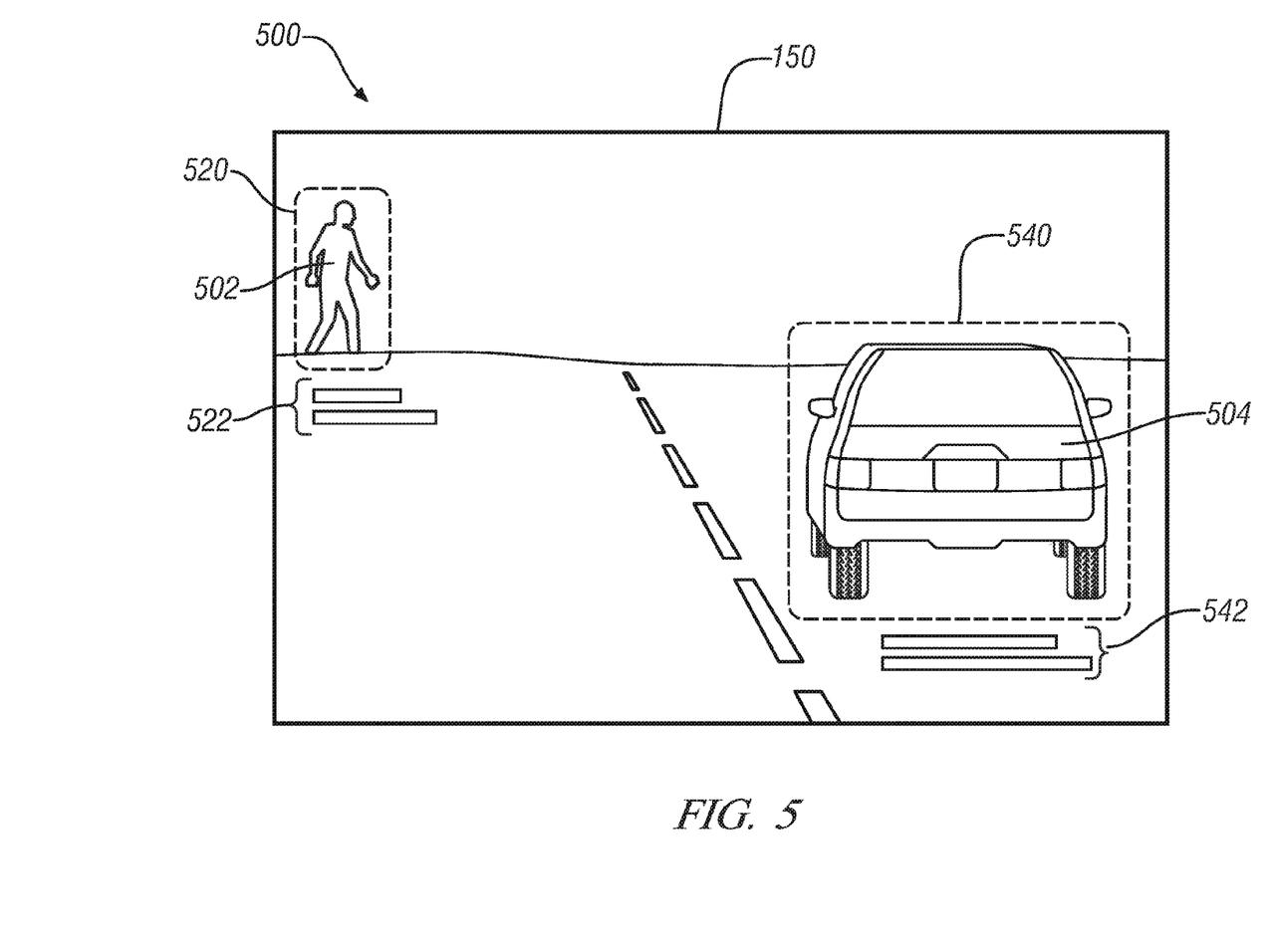
FIG. 5 is an example of a driving scene 500 including graphics dynamically registered upon a substantially transparent windscreen head-up display 150 of a vehicle, in accordance with the present disclosure.

Referring to FIG. 5, a driving scene 500 is illustrated through a substantially transparent windscreen head-up display 150 of a vehicle. A pedestrian 502 and a second vehicle 504 can be viewed through the windscreen head-up display 150. Utilizing methods described above, highlighted box graphics 520 and 540 are dynamically registered upon the substantially transparent windscreen head-up display 150 encompassing the pedestrian 502 and the second vehicle 504, respectively. It is appreciated that the pedestrian 502 and the second vehicle 504 are both identified social networking subscribers having broadcasted socialization attributes common to a search request by the vehicle, wherein the graphics 520 and 540 identify and locate the pedestrian 502 and the second vehicle 504, respectively. It is further appreciated that the driver may have entered a search request to identify and locate the interests of all social networking subscribers broadcasted socialization attributes, wherein a textual graphic 522 describes the socialization interests of the pedestrian 502, i.e., the pedestrian enjoys exercising. The driver may have additionally entered a search request to identify and locate the travel destinations of all vehicles within a block of the vehicle, wherein a textual graphic 544 describes the travel destination of the vehicle 504.

The above disclosure describes a substantially transparent head-up display capable of full-screen display. It will be appreciated that similar methods can be employed upon windscreens utilizing a substantially full-windscreen display, a partial windscreen display, for example limited to the driver's half of the windscreen, or a display focused or limited to the straight-forward typical center of view of the operator. The disclosure is not limited to windscreens, but can include substantially transparent head-up displays that include side windows or a rear window of a vehicle. Graphics can additionally be projected upon pillars of the vehicle. Many embodiments of displays are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to dynamically register a graphic onto a driving scene of a vehicle utilizing a substantially transparent windscreen head-up display, the graphic identifying social networking subscribers of a social networking service having socialization attributes common to the vehicle, comprising:
    monitoring the social networking service, comprising:
        monitoring informational inputs of the vehicle;
        monitoring broadcasted socialization attributes of the social networking subscribers; and
        identifying the social networking subscribers having the socialization attributes common to the vehicle based on the monitored informational inputs of the vehicle and the monitored broadcasted socialization attributes of the social networking subscribers;
    determining the graphic identifying the social networking subscribers having the socialization attributes common to the vehicle;
    dynamically registering a location of the graphic upon the substantially transparent windscreen head-up display corresponding to the driving scene of the vehicle; and
    displaying the graphic onto the driving scene of the vehicle utilizing a substantially transparent windscreen head-up display comprising one of light emitting particles or microstructures over a predefined region of the windscreen permitting luminescent display while permitting transmission therethrough.

2. The method of claim 1 further comprising monitoring an occupant eye location, wherein dynamically registering a location of the graphic upon the substantially transparent windscreen head-up display corresponding to the driving scene of the vehicle is based upon the occupant eye location.

3. The method of claim 2 further comprising monitoring a current orientation of the vehicle and monitoring a current location of the identified social networking subscribers having the socialization attributes common to the vehicle, wherein dynamically updating the registered location of the graphic upon the substantially transparent windscreen head-up display corresponding to the driving scene of the vehicle is further based on the current orientation of the vehicle and the current location of the identified social networking subscribers having the socialization attributes common to the vehicle.

4. The method of claim 3 further comprising monitoring an occupant gaze location, wherein determining the graphic identifying the social networking subscribers having the socialization attributes common to the vehicle comprises adding emphasis to the graphic based on a distance between the occupant gaze location and the current location of the identified social networking subscribers.

5. The method of claim 1 wherein monitoring informational inputs of the vehicle comprises monitoring a search request input by an occupant of the vehicle into the social networking service for identifying the social networking subscribers within a driving environment having the broadcasted socialization attributes common to the search request.

6. The method of claim 5 wherein the social networking subscribers within the driving environment comprises social networking subscribers located within a predetermined radius of the vehicle selected by the occupant.

7. The method of claim 5 wherein identifying the social networking subscribers having the socialization attributes common to the vehicle based on the monitored informational inputs of the vehicle and the monitored broadcasted socialization attributes of the social networking subscribers comprises monitoring a vehicle to vehicle communication;
    wherein the vehicle to vehicle communication comprises:
        conveying the search request input by the occupant of the vehicle into the social networking service to a second vehicle of the social networking service;
        transferring the socialization attributes common to the search request from the second vehicle to the vehicle and transferring the current location of the second vehicle from the second vehicle to the vehicle;
    wherein determining the graphic identifying the social networking subscribers having the socialization attributes common to the vehicle comprises utilizing a highlighted box encompassing the second vehicle; and
    wherein displaying the graphic onto the driving scene of the vehicle utilizing the substantially transparent windscreen head-up display comprises displaying the highlighted box encompassing the second vehicle onto the driving scene of the vehicle utilizing the substantially transparent windscreen head-up display.

8. The method of claim 1 wherein the social networking subscribers comprises pedestrians utilizing PDA devices.

9. The method of claim 1 wherein the graphic identifying the social networking subscribers having the socialization attributes common to the vehicle comprises a registered graphic on the driving scene comprises a highlighted box to encompass the social networking subscribers having the socialization attributes common to the vehicle.

10. The method of claim 1 wherein the graphic identifying the social networking subscribers having the socialization attributes common to the vehicle comprises a textual message describing the socialization attributes common to the vehicle.

11. The method of claim 10 further comprising monitoring an occupant gaze location, monitoring a current orientation of the vehicle and monitoring a current location of the identified social networking subscribers; and
    wherein determining the graphic identifying the social networking subscribers having the socialization attributes common to the vehicle comprises adding emphasis to the graphic based on a distance between the occupant gaze location and the current location of the identified social networking subscribers when the graphic comprises the textual message.

12. The method of claim 1 wherein identifying the social networking subscribers having the socialization attributes common to the vehicle based on the monitored informational inputs of the vehicle and the monitored broadcasted socialization attributes of the social networking subscribers comprises:
- identifying broadcasted socialization attributes of social networking subscribers that match the informational inputs of the vehicle; and
- determining the socialization attributes common to the vehicle based on the identified broadcasted socialization attributes of the social networking subscribers that match the informational inputs of the vehicle.

13. The method of claim 12 wherein the informational inputs of the vehicle comprise a friend network.

14. The method of claim 12 wherein the informational inputs of the vehicle comprise an interest.

15. The method of claim 12 wherein the common socialization attributes comprise a social status.

16. Method to dynamically register a graphic onto a driving scene of a vehicle utilizing a substantially transparent windscreen head-up display of the vehicle, the graphic locating other vehicles that possess desired socialization attributes of the vehicle based upon vehicle to vehicle communication, comprising:
- monitoring an occupant eye location;
- monitoring a current orientation of the vehicle;
- monitoring the vehicle to vehicle communication comprising:
  - conveying a search request for the desired socialization attributes from the vehicle to a plurality of other vehicles;
  - monitoring the location of the other vehicles that possess the desired socialization attributes;
- determining the graphic locating each of the other vehicles that possess the desired socialization attributes;
- dynamically registering a location of the graphic for each of the other vehicles upon the substantially transparent windscreen head-up display corresponding to the driving scene of the vehicle; and
- displaying the graphic upon the substantially transparent windscreen head-up display comprising one of light emitting particles or microstructures over a predefined region of the windscreen permitting luminescent display while permitting transmission therethrough;
- wherein the registered location of the graphic is dynamically updated on the driving scene based on the occupant eye location, the current orientation of the vehicle and the current location of each of the plurality of other vehicles that possess the desired socialization attributes.

17. The method of claim 16 wherein the vehicle to vehicle communication utilizes a social networking service wherein the vehicle and the plurality of other vehicles are subscribers of the social networking service.

18. The method of claim 16 wherein monitoring the location of the other vehicles that possess the desired socialization attributes comprises:
- receiving GPS and 3D map data conveying the location of the other vehicles that possess the desired socialization attributes.

19. The method of claim 16 further comprising:
- providing pertinent social information corresponding to the other vehicles that possess the desired socialization attributes;
- determining a second graphic describing the pertinent social information corresponding to the other vehicles that possess the desired socialization attributes; and
- wherein determining the graphic locating the other vehicles that possess the desired socialization attributes comprises a first graphic utilizing a highlighted box encompassing the other vehicles to locate the other vehicles;
- wherein determining the second graphic describing the pertinent social information corresponding to the other vehicles that possess the desired socialization attributes comprises utilizing a textual graphic describing the pertinent social information.

20. System to dynamically register a graphic onto a driving scene of a vehicle utilizing a substantially transparent windscreen head-up display, the graphic identifying social networking subscribers of a social networking service having socialization attributes common to the vehicle, comprising:
- a substantially transparent windscreen comprising one of light emitting particles or microstructures over a predefined region of the windscreen permitting luminescent display while permitting vision therethrough;
- an enhanced vision system system manager:
  - monitoring informational inputs of the vehicle;
  - monitoring broadcasted socialization attributes of the social networking subscribers;
  - identifying the social networking subscribers having the socialization attributes common to the vehicle based on the monitored informational inputs of the vehicle and the broadcasted socialization attributes of the social networking subscribers;
  - determining the graphic identifying the social networking subscribers having the socialization attributes common to the vehicle;
  - dynamically registering a location of the graphic upon the substantially transparent windscreen head-up display corresponding to the driving scene of the vehicle;
- a graphics system generating the graphic identifying the social networking subscribers having the socialization attributes common to the vehicle based upon the registered location of the graphic; and
- a graphics projection system communicating with the graphics system and displaying the graphic identifying the social networking subscribers having the socialization attributes common to the vehicle upon the substantially transparent windscreen head-up display.

* * * * *